F. V. JOHNSON.
BEARING.
APPLICATION FILED MAY 2, 1919.

1,342,541.

Patented June 8, 1920.

Fred V. Johnson
INVENTOR
BY William A. Stock
ATTORNEY

UNITED STATES PATENT OFFICE.

FRED V. JOHNSON, OF BERKELEY, CALIFORNIA.

BEARING.

1,342,541.  Specification of Letters Patent.  Patented June 8, 1920.

Application filed May 2, 1919. Serial No. 294,171.

*To all whom it may concern:*

Be it known that I, FRED V. JOHNSON, citizen of the United States, residing at Berkeley, in the county of Alameda and State of California, have invented certain new and useful Improvements in Bearings, of which the following is a specification.

This invention relates to improvements in anti-friction bearings, and more especially to a form of bearing particularly adapted for use in connection with the movable trackway illustrated in my allowed application Serial No. 262,062, filed Nov. 11, 1918.

The principal object of the present invention is to provide a bearing which will carry heavy direct loads as well as take care of lateral thrusts. A further object is to provide a bearing for this purpose, which is rugged enough in construction and inexpensive enough that it may be used in tractor work.

With these and other objects in view my invention consists of certain novel features of construction, combinations and arrangements of parts hereinafter described and more specifically pointed out in the appended claims.

Reference being had to the drawings forming a part of the specification,

Figure 1:
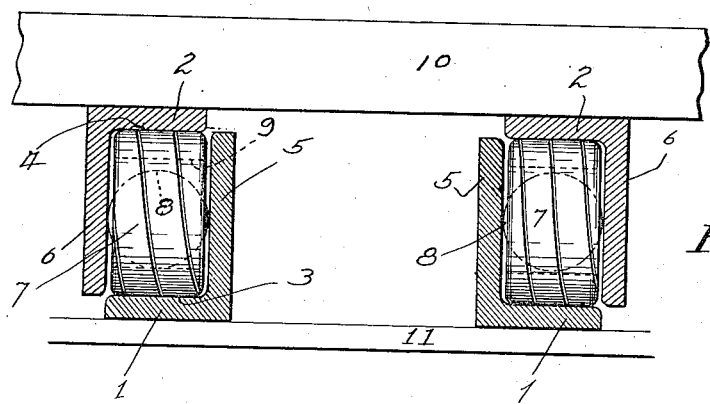
Figure 1 is a view in section through a bearing constructed in accordance with my invention.
Figure 2:
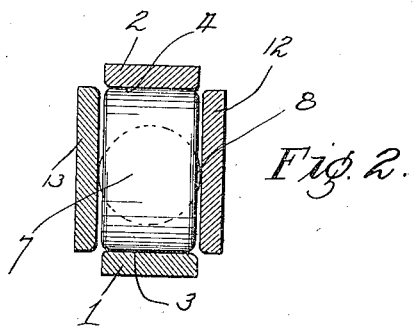
Fig. 2 is a view in section of a modified form of the bearing.

Referring to corresponding parts in the several views by the same numerals of reference, 1 and 2 denote two relatively movable members having parallel tread surfaces 3 and 4. As here shown these members are angular in cross-section, the flanges 5 and 6 extending at right angles to the tread members and toward the opposite members.

Interposed between the tread members 1 and 2 are closely spaced cylindrical rollers 7 which have a width slightly less than the distance between the flanges 5 and 6. These rollers have a cylindrical axial opening 9 which has a diameter greater than the distance between the faces of the flanges. In the form shown in Fig. 1 these rollers have rounded outer corners and are formed by spirally winding metal strips of rectangular cross-section.

Figure 3:
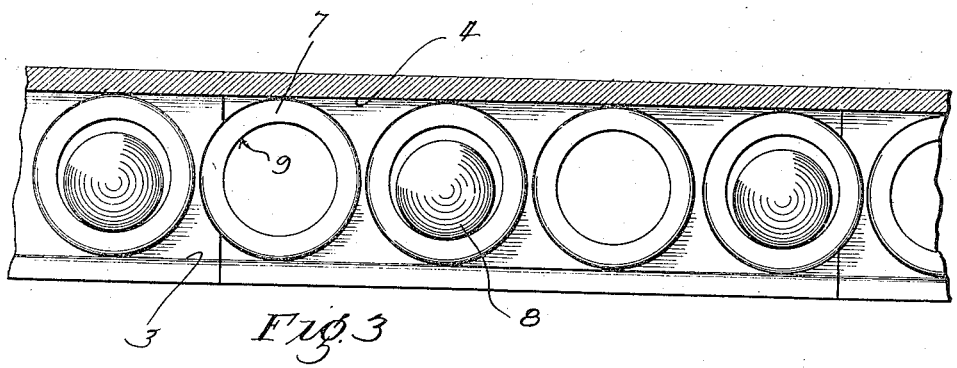
Fig. 3 is a view in side elevation of a section of the bearing.

Within the openings 9 are balls 8 which have a diameter equal or slightly smaller than the distance between the faces of the side members 5 and 6. These balls need not be placed in each roller, but as shown in Fig. 3, may be spaced equally around the bearings according to the load which they will have to carry.

With a single bearing of this character the thrust loads would be taken care of in one direction only and where such loads may be from either direction, I provide two oppositely disposed bearings as shown in Fig. 1. The members 1 and 2 are in this case rigidly connected by members 10 and 11.

In the modified form, a solid cylindrical roller is used and the side members 12 and 13 need not be integrally formed with the tread members, and do not necessarily move at the same speed as these members.

In use, one of the members as 1, is held stationary and supports the load while the other member 2, moves and carries the load. Under ordinary conditions the weight is transmitted from one member to the other through the rollers 7 and the balls are practically free. But if a load is applied parallel to the axes of the rollers, then the balls come into action and roll on the surfaces of the side members and so act as a ball thrust bearing. Such side thrusts are particularly common in the tractors of the creeping tread type for which this bearing is particularly adapted. In turning a machine of this character a thrust is produced in one direction at one end of the tread, and in the opposite direction at the other end. In side hill work the bearings are positioned on an angle so that part of the weight of the tractor acts to produce a thrust. In either case this bearing will effectively take care of both the direct and thrust loads.

I claim as new and wish to cover by Letters Patent:—

1. A bearing of the character described comprising two relatively movable tread plates and side plates, cylindrical rollers having axial openings between said tread plates and balls in said openings interposed between said side plates.

2. A bearing of the character described comprising tread plates and side plates positioned at an angle thereto, rollers interposed between said tread plates, said rollers having axial openings, and balls in said openings adapted to roll between said side plates.

3. A bearing of the character described comprising tread members, thrust members, rollers between said tread members, and balls between said thrust members, said rollers having axial openings for the reception of said balls.

4. A bearing of the character described comprising oppositely disposed angle members having parallel tread surfaces and thrust surfaces at right angles thereto, rollers having axial extending openings interposed between said tread surfaces, and balls between said thrust surfaces.

5. A bearing comprising tread plates and thrust plates disposed at right angles thereto, annular cylindrical rollers between said tread plates and balls positioned within said rollers adapted to roll on said thrust plates.

6. A bearing comprising two pair of relatively movable members, annular rollers interposed between the surfaces of one pair, and balls interposed between the surfaces of said other pair, said balls being located in said annular rollers.

7. A bearing comprising two pair of relatively movable members, the inner surfaces of one of said pair being at right angles to those of the other pair, cylindrical rollers having axial openings interposed between the surfaces of one of said pairs, and balls interposed between the surfaces of the other of said pairs said balls being held within the openings of said rollers.

In testimony whereof I affix my signature.

FRED V. JOHNSON.